United States Patent
Asano et al.

(10) Patent No.: US 12,021,357 B2
(45) Date of Patent: Jun. 25, 2024

(54) ELECTRICAL CONNECTION BOX

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Ayaka Asano, Yokkaichi (JP); Kazuya Komaki, Yokkaichi (JP); Hiroki Shimoda, Yokkaichi (JP); Taiji Yanagida, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 236 days.

(21) Appl. No.: 17/754,178

(22) PCT Filed: Aug. 6, 2020

(86) PCT No.: PCT/JP2020/030158
§ 371 (c)(1),
(2) Date: Mar. 25, 2022

(87) PCT Pub. No.: WO2021/059767
PCT Pub. Date: Apr. 1, 2021

(65) Prior Publication Data
US 2023/0028663 A1    Jan. 26, 2023

(30) Foreign Application Priority Data

Sep. 26, 2019  (JP) .................................. 2019-175970

(51) Int. Cl.
*H05K 5/00* (2006.01)
*B60R 16/023* (2006.01)
(Continued)

(52) U.S. Cl.
CPC ........... *H02G 3/03* (2013.01); *B60R 16/0239* (2013.01); *H02G 3/16* (2013.01)

(58) Field of Classification Search
CPC .................................................. H05K 5/0017
(Continued)

(56) References Cited

U.S. PATENT DOCUMENTS

| 5,023,752 A | * | 6/1991 | Detter | ................. B60R 16/0238 361/752 |
| 2005/0087355 A1 | * | 4/2005 | Ikeda | ................. B60R 16/0238 174/50 |

(Continued)

FOREIGN PATENT DOCUMENTS

| JP | 2005-151670 A | 6/2005 |
| JP | 2012-216871 A | 11/2012 |

(Continued)

OTHER PUBLICATIONS

International Search Report, Application No. PCT/JP2020/030158, mailed Oct. 13, 2020. ISA/Japan Patent Office.

*Primary Examiner* — Hung S. Bui
(74) *Attorney, Agent, or Firm* — Honigman LLP

(57) ABSTRACT

An electrical connection box for installation in a vehicle includes a bus bar to electrically and thermally interconnect a plurality of electrical components electrically connected to a power storage device or in-vehicle load installed in the vehicle, a casing to house the plurality of electrical components and the bus bar, and an insulating heat dissipation member thermally connected to the bus bar and the casing, with at least two of the plurality of electrical components being disposed adjacent to each other, and the bus bar dissipating heat from the two electrical components via the heat dissipation member.

6 Claims, 8 Drawing Sheets

(51) Int. Cl.
*H02G 3/03* (2006.01)
*H02G 3/16* (2006.01)

(58) Field of Classification Search
USPC .............................. 361/728, 752, 796, 800
See application file for complete search history.

(56) References Cited

U.S. PATENT DOCUMENTS

| | | | |
|---|---|---|---|
| 2006/0258186 A1* | 11/2006 | Egawa | H01R 13/518 |
| | | | 439/76.2 |
| 2010/0202120 A1* | 8/2010 | Kita | B60R 16/0238 |
| | | | 361/752 |
| 2017/0150640 A1 | 5/2017 | Yamanaka et al. | |
| 2019/0318892 A1 | 10/2019 | Ikejiri et al. | |

FOREIGN PATENT DOCUMENTS

| | | |
|---|---|---|
| JP | 2016-025736 A | 2/2016 |
| JP | 2020-127302 A | 8/2020 |

\* cited by examiner

ELECTRICAL CONNECTION BOX

CROSS-REFERENCE TO RELATED APPLICATIONS

This application is the U.S. national stage of PCT/JP2020/030158 filed on Aug. 6, 2020, which claims priority of Japanese Patent Application No. JP 2019-175970 filed on Sep. 26, 2019, the contents of which are incorporated herein.

TECHNICAL FIELD

The present disclosure relates to an electrical connection box.

BACKGROUND

Electrical wires that are installed in a vehicle and supply power to in-vehicle loads within the vehicle from an in-vehicle battery are initially connected to an electrical connection box (junction box), and are connected to respective in-vehicle loads via the electrical connection box (e.g., JP 2016-25736A). The electrical connection box of JP 2016-25736A includes a relay and a box body to which the relay is fixed.

Electrical components such as relays that are housed in an electrical connection box generate heat due to the flow of current, wherein lies a problem with the electrical connection box of JP 2016-25736A in that such heat generation caused by electrical components is not taken into consideration.

An object of the disclosure is to provide an electrical connection box that is able to efficiently dissipate heat generated by electrical components that are housed in the electrical connection box.

SUMMARY OF DISCLOSURE

An electrical connection box according to one mode of the disclosure is an electrical connection box for installation in a vehicle, including a bus bar to electrically and thermally interconnect a plurality of electrical components electrically connected to a power storage device or an in-vehicle load installed in the vehicle, a casing to house the plurality of electrical components and the bus bar, and an insulating heat dissipation member thermally connected to the bus bar and the casing, with at least two of the plurality of electrical components being disposed adjacent to each other, and the bus bar dissipating heat from the two electrical components via the heat dissipation member.

Advantageous Effects of Disclosure

According to one mode of the disclosure, an electrical connection box that efficiently dissipates heat generated by electrical components that are housed in the electrical connection box can be provided.

DETAILED DESCRIPTION OF PREFERRED EMBODIMENTS

Figure 1:
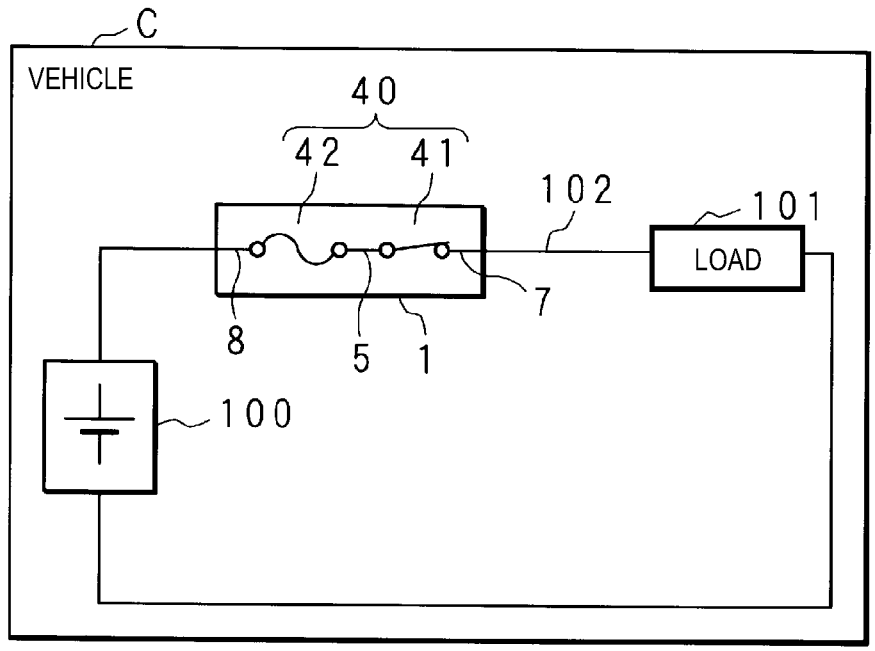
FIG. 1 is a schematic diagram showing a vehicle equipped with an electrical connection box according to a first embodiment.

Initially, modes for carrying out the disclosure will be enumerated and described. Also, at least some of the modes described below may be discretionarily combined.

Mode (1)

An electrical connection box according to a first mode of the disclosure is an electrical connection box for installation in a vehicle, including a bus bar to electrically and thermally interconnect a plurality of electrical components electrically connected to a power storage device or an in-vehicle load installed in the vehicle, a casing to house the plurality of electrical components and the bus bar, and an insulating heat dissipation member thermally connected to the bus bar and the casing, with at least two of the plurality of electrical components being disposed adjacent to each other, and the bus bar dissipating heat from the two electrical components via the heat dissipation member.

In the first mode, since the two electrical components to undergo heat dissipation are disposed adjacent to each other, the length of the bus bar connecting these two electrical components can be shortened in the extension direction and the thermal resistance of the bus bar can be reduced. Accordingly, heat generated from a plurality of electrical components disposed adjacent to each other can be efficiently dissipated by a single bus bar and heat dissipation member.

Mode (2)

In the electrical connection box according to a second mode of the disclosure, the bus bar includes a first plate part to be in intimate contact with at least one of the two electrical components, and a laminate structure is formed by the one electrical component, the first plate part of the bus bar, the heat dissipation member, and the portion of the casing to which the heat dissipation member is affixed.

In the second mode, the bus bar includes a first plate part in intimate contact with one of the electrical components, and a laminate structure is formed by the one electrical component, the first plate part of the bus bar, the heat dissipation member and the portion of the casing to which the heat dissipation member is affixed being in surface contact with each other. Since the two electrical components are disposed adjacent to each other, the heat generated from the two electrical components is efficiently transferred to the casing of the electrical connection box by the laminate structure including the first plate part of the bus bar and the like, and the generated heat can be efficiently dissipated outside the electrical connection box.

Mode (3)

In the electrical connection box according to a third mode of the disclosure, the heat dissipation member is sheet-like, and an area of the heat dissipation member is larger than an area of a region the first plate part in intimate contact with the one electrical component.

In the third mode, since the area of the sheet-like heat dissipation member is larger than the area of the region of the first plate part that is in intimate contact with the electrical component, the bus bar and the heat dissipation member can be laminated by reliably overlapping this region that is in intimate contact and the heat dissipation member in plan view.

Mode (4)

The electrical connection box according to a fourth mode of the disclosure includes a second heat dissipation member provided on an outer surface of the casing, and a laminate structure is formed by the heat dissipation member, the portion of the casing to which the heat dissipation member is affixed, and the second heat dissipation member.

In fourth mode, since a laminate structure is formed by the heat dissipation member, the portion of the casing to which the heat dissipation member is affixed and the second heat dissipation member being in surface contact with each other, heat exchange with a cooling source such as ambient air that is located outside the casing can be promoted by the second heat dissipation member. Accordingly, heat generation caused by two electrical components disposed adjacent to each other can be dissipated outside the electrical connection box more efficiently.

Mode (5)

In the electrical connection box according to a fifth mode of the disclosure, the heat dissipation member and the second heat dissipation member are formed with an identical material and shape.

In the fifth mode, the heat dissipation member and the second heat dissipation member are formed with the same material and shape, and are thus treated as the same component (part number), and, at the manufacturing stage, misassembly when attaching the heat dissipation member and the second heat dissipation member to the casing can be prevented.

Mode (6)

In the electrical connection box according to a sixth mode of the disclosure, the bus bar includes the first plate part to be in intimate contact with one of the two electrical components, a second plate part to be in intimate contact with the other electrical component, and a coupling plate part interposed between the first plate part and the second plate part, and a surface width of the coupling plate part in an extension direction of the bus bar is smaller than surface widths of the first plate part and the second plate part.

In the sixth mode, since the bus bar includes the first plate part and the second plate part that are each in intimate contact with a different one of the two electrical components, heat generated from the electrical components can be efficiently transferred to the bus bar by the first plate part and second plate part. Since the surface width of the coupling plate part that is interposed between the first plate part and the second plate part is smaller than the surface widths of both the first plate part and the second plate part, the thermal resistance of the bus bar can be reduced. Accordingly, heat generated from these electrical components can be efficiently transferred to the heat dissipation member and dissipated outside the electrical connection box.

Mode (7)

In the electrical connection box according to the seventh mode of the disclosure, an amount of heat generated per unit time by each of the two electrical components when power is supplied to the in-vehicle load from the power storage device differs, and the heat dissipation member is provided on a side on which the electrical component that generates more heat out of the two electrical components is provided.

In the seventh mode, since the heat dissipation member is provided on the side on which the electrical component that generates more heat out of the two electrical components is provided, heat transferred from the two electrical components to the bus bar is efficiently dissipated outside the electrical connection box via the heat dissipation member, and an increase in the size of the heat dissipation member is suppressed by forming the heat dissipation member to a size corresponding to the electrical component that generates more heat, enabling a reduction in component cost and a reduction in the size and weight of the electrical connection box to be achieved.

Mode (8)

In the electrical connection box according to an eighth mode of the disclosure the two electrical components are a relay and a fuse.

In the eighth mode, by disposing the relay and fuse adjacent to each other, heat generated from the relay and fuse can be efficiently dissipated outside the electrical connection box.

Mode (9)

The electrical connection box according to a ninth mode of the disclosure includes a temperature sensor to detect heat generated by the two electrical components, and the temperature sensor is provided on the bus bar.

In the ninth mode, a temperature sensor is provided on the bus bar, and thus heat generated from electrical components disposed adjacent to each other can be detected with a single temperature sensor, allowing the number of temperature sensors mounted in the electrical connection box to be reduced, and enabling a reduction in component cost and a reduction in the size and weight of the electrical connection box to be achieved.

Specific examples of an electrical connection box 1 according to embodiments of the disclosure will be described below with reference to the drawings. Note that the disclosure is not limited to these illustrative examples and is defined by the claims, and all changes which come within the meaning and range of equivalency of the claims are intended to be encompassed therein.

First Embodiment

FIG. 1 is a schematic diagram showing a vehicle C equipped with the electrical connection box 1 according to a first embodiment. The electrical connection box 1 in the present embodiment is installed in the vehicle C, and is provided to be interposed between a power storage device 100 and an in-vehicle load 101 that are similarly installed in the vehicle C. The power storage device 100 and the in-vehicle load 101 are electrically connected by an electrical wire 102, via the electrical connection box 1.

In the present embodiment, the in-vehicle load 101 is described as being singular, but the number of in-vehicle loads 101 is not limited to one. There may be a plurality of in-vehicle loads 101 installed in the vehicle C, and a configuration may be adopted in which a branch portion is provided between the electrical connection box 1 and the plurality of in-vehicle loads 101, the electrical wire 102 that is connected to the positive electrode of the power storage device 100 is branched by the branch portion, and the branched electrical wire 102 is connected to each of the plurality of in-vehicle loads 101.

In the present embodiment, the electrical connection box 1 is connected to the positive electrode side of the power storage device 100, but the disclosure is not limited thereto. The electrical connection box 1 may be connected to the negative electrode side of the power storage device 100. Alternatively, the electrical connection box 1 may be connected to both the positive electrode side and the negative electrode side of the power storage device 100.

The power storage device 100 is a high-voltage battery for an EV (Electric Vehicle) such as a lead battery or a lithium-ion battery, for example.

The electrical connection box 1 houses electrical components 40. The electrical components 40 include a fuse 42 and a relay 41, for example. The relay 41 may be a mechanical relay or a semiconductor relay. The fuse 42 and the relay 41 included as electrical components 40 are connected by a bus bar and constitute a series circuit. The relay 41 and the in-vehicle load 101 are connected via a second bus bar 7. The fuse 42 and the power storage device 100 are connected via a third bus bar 8. The relay 41 is communicably connected by a signal line to an ECU (not shown) of a power control system installed in the vehicle C, and is turned on or off according to a signal output from the ECU.

Figure 2:
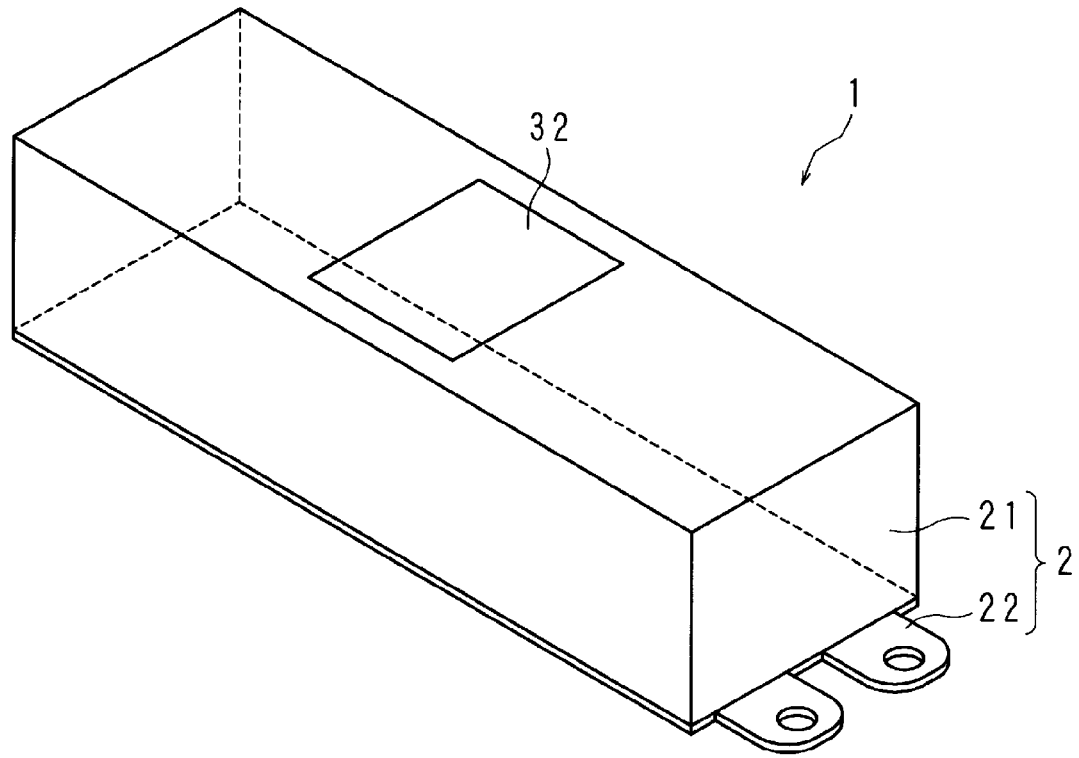
FIG. 2 is a perspective view schematically showing an outer appearance of the electrical connection box.

FIG. 2 is a perspective view schematically showing the outer appearance of the electrical connection box 1. The electrical connection box 1 includes a casing 2 forming the outer shape. The casing 2 forms a rectangular parallelepiped made of insulating resin, and includes an upper case 21 and a lower case 22. The casing 2 is preferably made of a heat dissipating resin such as a heat dissipating polypropylene or a heat dissipating polyamide resin, for example.

The upper case 21 forms a box body having an opening. On the inner side of the upper case 21 is provided a fixing member (not shown) constituting an inner wall of the upper case 21, for example. The electrical components 40 including the relay 41 and the fuse 42 are fixed to the inside the upper case 21 by this fixing member.

The lower case 22 forms a plate-like or dish-like lid, for example, and is provided to close the opening of the upper case 21.

The casing 2 forming the outer shape of the electrical connection box 1 is constituted by the lower case 22 engaging the opening of the upper case 21. The electrical connection box 1 constituted in this way is placed in the vicinity of the power storage device 100, for example.

Figure 3:
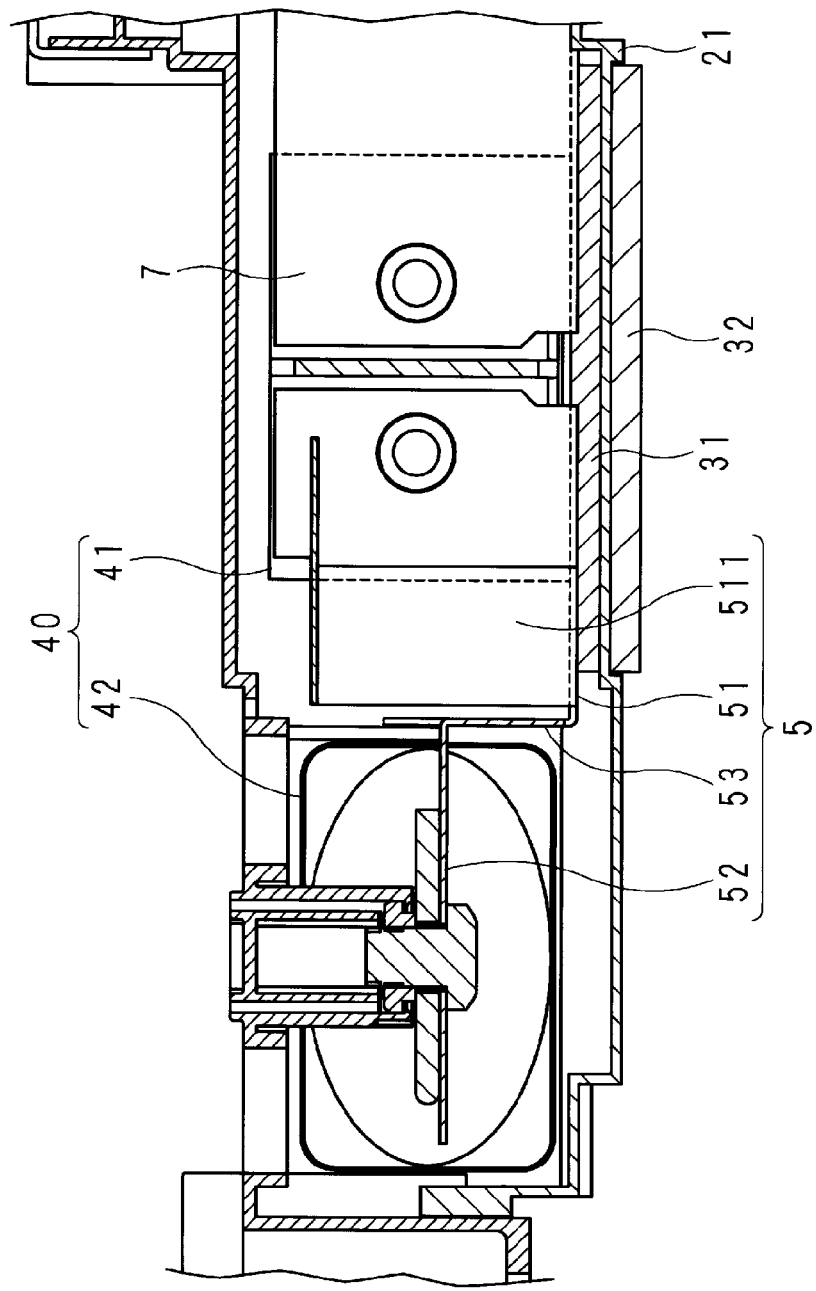
FIG. 3 is a side cross-sectional view schematically showing the inside of the electrical connection box.
Figure 4:
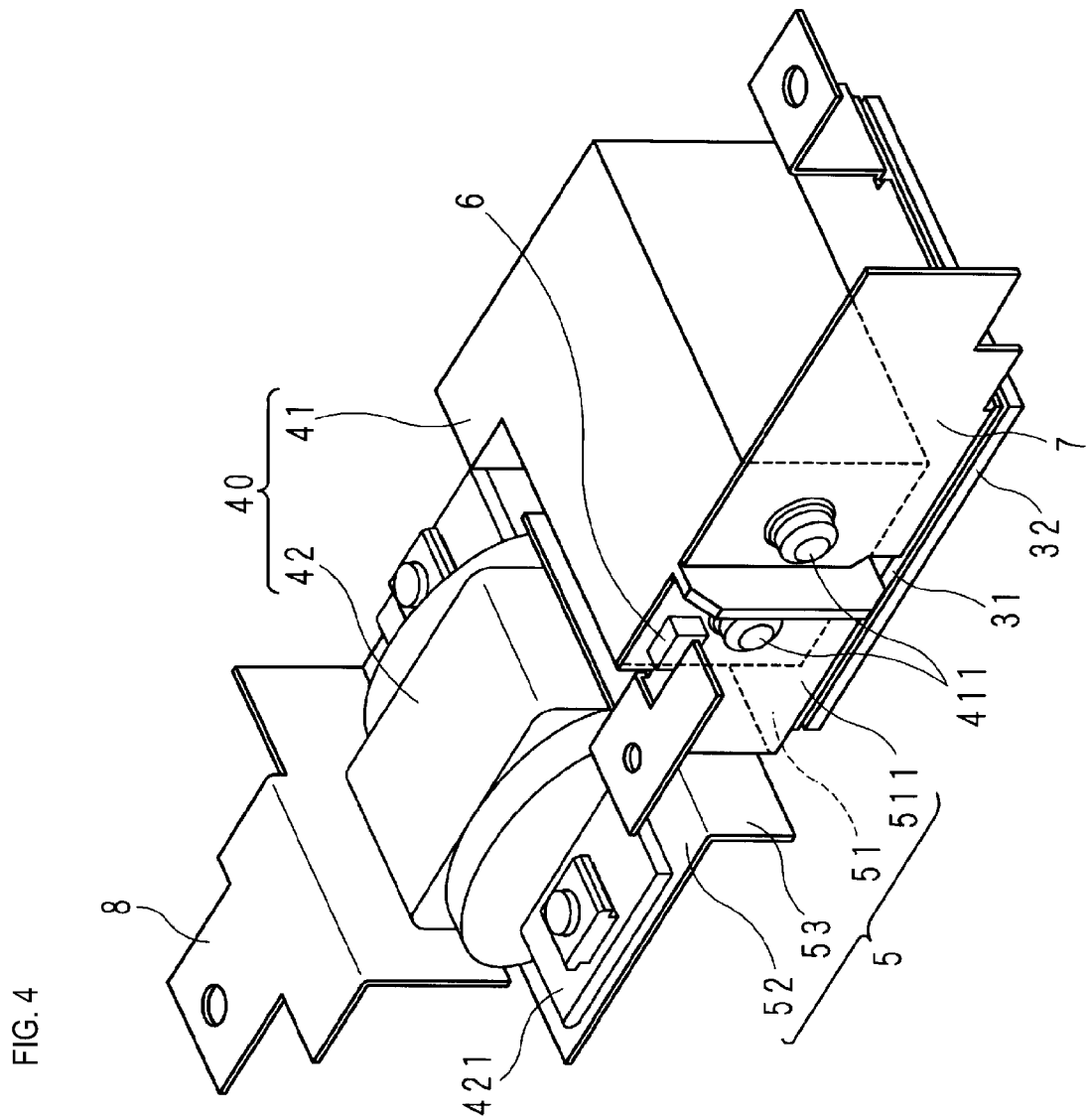
FIG. 4 is an illustrative diagram showing a state in which two electrical components are connected by a bus bar.

FIG. 3 is a side cross-sectional view schematically showing the inside of the electrical connection box 1. FIG. 4 is an illustrative diagram showing a state in which two electrical components 40 are connected by a bus bar 5. FIGS. 3 and 4 illustrate the opening side of the upper case 21 as the upper side. FIG. 3 schematically shows a side cross-section parallel to the longitudinal direction of the casing 2. FIG. 4 is a perspective view of a state in which the fuse 42 and the relay 41 are connected by the bus bar 5 with the upper case 21 removed.

The electrical connection box 1 includes the plurality of electrical components 40 including the fuse 42 and the relay 41, the bus bar 5, the second bus bar 7, the third bus bar 8, a temperature sensor 6, a heat dissipation member 31, and a second heat dissipation member 32. The plurality of electrical components 40 including the fuse 42 and the relay 41, the bus bar 5 connecting the fuse 42 and the relay 41, the second bus bar 7, the temperature sensor 6 and the heat dissipation member 31 are housed inside the upper case 21 constituting the casing 2 of the electrical connection box 1. The second heat dissipation member 32 is affixed to the outer surface of the upper case 21.

The relay 41 forms a rectangular parallelepiped. On one side surface of the relay 41, relay terminals 411 on the positive electrode side and negative electrode side are provided side by side. An insulating wall is provided to protrude from the one side surface between the relay terminals 411 on the positive electrode side and negative electrode side.

The fuse 42 forms a rectangular parallelepiped. On one side surface of the fuse 42 and the opposing side surface of the one side surface, fuse terminals 421 on the positive electrode side and negative electrode side are provided. As shown in FIGS. 3 and 4, the fuse 42 and the relay 41 are disposed adjacent with respective side surfaces facing each other.

The fuse 42 is connected so as to be positioned on the positive electrode side of the power storage device 100 relative to the relay 41 (see FIG. 1), and the fuse terminal 421 of the fuse 42 on the positive electrode side is connected to the positive electrode of the power storage device 100 via the third bus bar 8. The fuse terminal 421 of the fuse 42 on the negative electrode side and the relay terminal 411 of the relay 41 on the positive electrode side are connected by the bus bar 5. The relay terminal 411 of the relay 41 on the negative electrode side is connected to the in-vehicle load 101 via the second bus bar 7.

The bus bar 5 is constituted by of plate member having a plurality of bent portions, and is made of a metal having a high conductivity and heat transfer rate such as copper or a copper alloy. The bus bar 5 includes a first plate part 51, a second plate part 52 and a coupling plate part 53.

The relay 41 is placed on the first plate part 51, and the relay 41 and the first plate part 51 of the bus bar 5 are in intimate contact with each other. The fuse terminal 421 of the fuse 42 on the negative electrode side is fastened to the second plate part 52, and the fuse terminal 421 of the fuse 42 on the negative electrode side and the second plate part portion 52 of the bus bar 5 are in intimate contact with each other. Due to the relay 41 and the fuse 42 being in intimate contact with the bus bar 5 in this way, heat generated by the relay 41 and the fuse 42 is transferred to the bus bar 5.

The first plate part 51 and the second plate part 52 are provided to be substantially parallel to each other, and the coupling plate part 53 is provided between the first plate part 51 and the second plate part 52. The second plate part 52 to which the fuse terminal 421 is fastened is provided at a higher position than the first plate part 51 on which the relay 41 is placed, taking the bottom surface of the upper case 21 as the basis, and the coupling plate part 53 is provided so as to take up the inter-surface distance resulting from the difference in height between the first plate part 51 and the second plate part 52. Accordingly, as shown in FIG. 3, a crank shape is formed by the first plate part 51, the coupling plate part 53 and the second plate part 52 in side view.

At an end portion of the first plate part 51 is provided a first terminal fastening piece 511 bent substantially perpendicular to the first plate part 51. The relay terminal 411 of the relay 41 on the positive electrode side is fastened to the first terminal fastening piece 511.

The heat dissipation member 31 is provided between the first plate part 51 of the bus bar 5 and the bottom plate of the upper case 21. That is, the heat dissipation member 31 is interposed between the first plate part 51 and the upper case 21, and is in surface contact with both the first plate part 51 and the upper case 21. Accordingly, a laminate structure is formed by the first plate part 51 of the bus bar 5, the heat dissipation member 31 and the bottom plate of the upper case 21, and heat generated by the relay 41 and the fuse 42 can be efficiently dissipated outside the electrical connection box 1 from the upper case 21, via the bus bar 5.

The heat dissipation member 31 is a rectangular sheet-like heat dissipation sheet made of a resin having insulating and heat transfer properties such as a silicone-based resin, a non-silicone-based resin or an acrylic-based resin, for example. Alternatively, the heat dissipation member 31 may be a graphite sheet whose surface has been insulated.

The area of the heat dissipation member 31 is larger than the area of the region (intimate contact region) of the first plate part 51 of the bus bar 5 on which the relay 41 is placed that is in intimate contact with the relay 41. Accordingly, the bus bar 5 and the heat dissipation member 31 are laminated by reliably overlapping the region (intimate contact region) in which the relay 41 and the first plate part 51 are in intimate contact and the heat dissipation member with each other in plan view, thus enabling the heat transfer efficiency of the bus bar 5 and the heat dissipation member 31 to be improved.

While a detailed description will be given separately, the surface width of the coupling plate part 53 is smaller than the surface widths of the first plate part 51 and the second plate part 52, in the extension direction of the bus bar 5, that is, in the disposition direction of the relay 41 and the fuse 42 that are connected by the bus bar 5. By providing the fuse 42 and the relay 41 adjacent to each other and close together, the surface width of the coupling plate part 53 can be made smaller than the surface widths of the first plate part 51 and the second plate part 52, and the thermal resistance of the bus bar 5 can be reduced. Accordingly, heat generated by the fuse 42 that is transferred from the second plate part 52 can be transferred via the coupling plate part 53 and the first plate part 51, and can be dissipated from the heat dissipation member 31.

The fuse 42 and the relay 41 are provided adjacent to each other, and the coupling plate part 53 is provided between the opposing side surfaces of the fuse 42 and the relay 41. The opposing side surfaces of the fuse 42 and the relay 41 are close together, and the fuse 42 and the relay 41 are disposed adjacent to each other such that the inter-surface distance between the opposing side surfaces of the fuse 42 and the relay 41 is not more than five times, for example, the size of the plate thickness of the coupling plate part 53. By bringing the opposing side surfaces of the fuse 42 and the relay 41 close together and providing the coupling plate part 53 between the opposing side surfaces in this way, the amount of heat emitted from the side surfaces of the fuse 42 and the relay 41 is transferred to the heat dissipation member 31 via the coupling plate part 53, enabling the heat dissipation efficiency to be further improved.

The heat dissipation member 31 is provided to overlap the first plate part 51 on which the relay 41 is placed in plan view. That is, the heat dissipation member 31 is provided to be displaced to the side on which the relay 41 is disposed in the extension direction of the bus bar 5. When power is supplied from the power storage device 100 to the in-vehicle load 101, the amount of heat generated by the relay 41 per unit time is greater than the amount of heat generated by the fuse 42. By providing the heat dissipation member 31 on the side on which the relay 41 which is the electrical component 40 that generates the greater amount of heat per unit time is provided, an increase in the size the heat dissipation member 31 can be suppressed while securing a heat dissipation effect, enabling a reduction in component cost and a reduction in the size and weight of the electrical connection box 1 to be achieved.

The heat dissipation member 31 may be provided to overlap the plate part of the second bus bar 7 that is connected to the relay terminal 411 of the relay 41 on the negative electrode side. The plate part of the second bus bar 7 is a plate part on which the relay 41 is placed, similarly to the first plate part 51 of the bus bar 5. By providing the heat dissipation member 31 to overlap the first plate part 51 of the bus bar 5 and the plate part of the second bus bar 7, the heat transfer area between the relay 41 and the heat dissipation member 31 can be increased, and the heat dissipation efficiency with respect to heat generated by the relay 41 can be further improved.

The second heat dissipation member 32 is provided on the outer surface of the bottom plate of the upper case 21. That is, the second heat dissipation member 32 is affixed to the outer surface of the casing 2 that is constituted by the upper case 21 and the lower case 22. The second heat dissipation member 32 is a rectangular sheet-like heat dissipation sheet made of a resin having insulating and heat transfer properties such as a silicone-based resin, a non-silicone-based resin or an acrylic-based resin, for example. Alternatively, the second heat dissipation member 32 may be a graphite sheet. The area of the second heat dissipation member 32 is larger than the area of the region (intimate contact region) of the first plate part 51 of the bus bar 5 on which the relay 41 is placed that is in intimate contact with the relay 41.

The heat dissipation member 31 is affixed to the inner surface of the bottom plate of the upper case 21, and the second heat dissipation member 32 is affixed to the outer surface of the bottom plate of the upper case 21. A laminate structure is thereby formed by the first plate part 51 of the bus bar 5, the heat dissipation member 31, the bottom plate of the upper case 21 and the second heat dissipation member 32, and heat generated by the relay 41 and the fuse 42 can be efficiently dissipated outside the electrical connection box 1 from the second heat dissipation member 32, via the bus bar 5. That is, due to the second heat dissipation member 32 being exposed outside the electrical connection box 1, and contacting the air around the electrical connection box 1 or a chassis to which the electrical connection box 1 is attached or another in-vehicle device in the cooling system, heat exchange takes place with the chassis or the like. Accordingly, heat generated by the fuse 42 and the relay 41 can be efficiently transferred outside the electrical connection box 1, and an increase in the temperature of the electrical connection box 1 can be suppressed.

The second heat dissipation member 32 may be the same material and the same shape and size as the heat dissipation member 31. That is, the heat dissipation member 31 and the second heat dissipation member 32 may be managed as the same part number (PN) at the manufacturing stage of the electrical connection box 1. By treating the heat dissipation member 31 and the second heat dissipation member 32 as the same component, mis-assembly when the heat dissipation member 31 and the second heat dissipation member 32 are attached to the casing 2 can be prevented at the manufacturing stage, and component cost can be reduced due to the use of common components.

In the case where the second heat dissipation member 32 is formed to be the same shape and size as the heat dissipation member 31, the second heat dissipation member 32 and the heat dissipation member 31 may be affixed to the outer surface and the inner surface of the bottom plate of the upper case 21 such that the second heat dissipation member 32 and the heat dissipation member 31 overlap in plan view. By affixing the second heat dissipation member 32 and the heat dissipation member 31 to the bottom plate of the upper case 21 to overlap each other in plan view, the effect of dissipating heat outside the electrical connection box 1 can be further improved.

The temperature sensor 6 that detects and outputs a physical amount relating to the temperature of the bus bar 5 is provided on the first terminal fastening piece 511 of the bus bar 5. The temperature sensor 6 is affixed to the surface of the first terminal connection piece 511 on the opposite side to the relay 41. Alternatively, the temperature sensor 6 may be affixed to the surface of the first terminal fastening piece 511 on the side on which the relay 41 is provided. The temperature sensor 6 includes a thermistor such as an NTC thermistor, a PTC thermistor or a CTR thermistor, for example, or may be a sensor using a thermocouple.

The temperature sensor 6 is provided on the bus bar 5, and the bus bar 5 is connected to the relay 41 and the fuse 42 that are adjacent in close proximity to each other. Accordingly, the temperature due to heat generated by the relay 41 and the fuse 42 can be detected by a single temperature sensor 6 provided on the bus bar 5, allowing the number of temperature sensors 6 mounted in the electrical connection box 1 to be reduced, and enabling a reduction in component cost and a reduction in the size and weight of the electrical connection box 1 to be achieved.

The temperature sensor 6 is provided on the first terminal fastening piece 511, but the disclosure is not limited thereto. The temperature sensor 6 may be affixed to the first plate part 51, the coupling plate part 53 or the second plate part 52.

Figure 5:
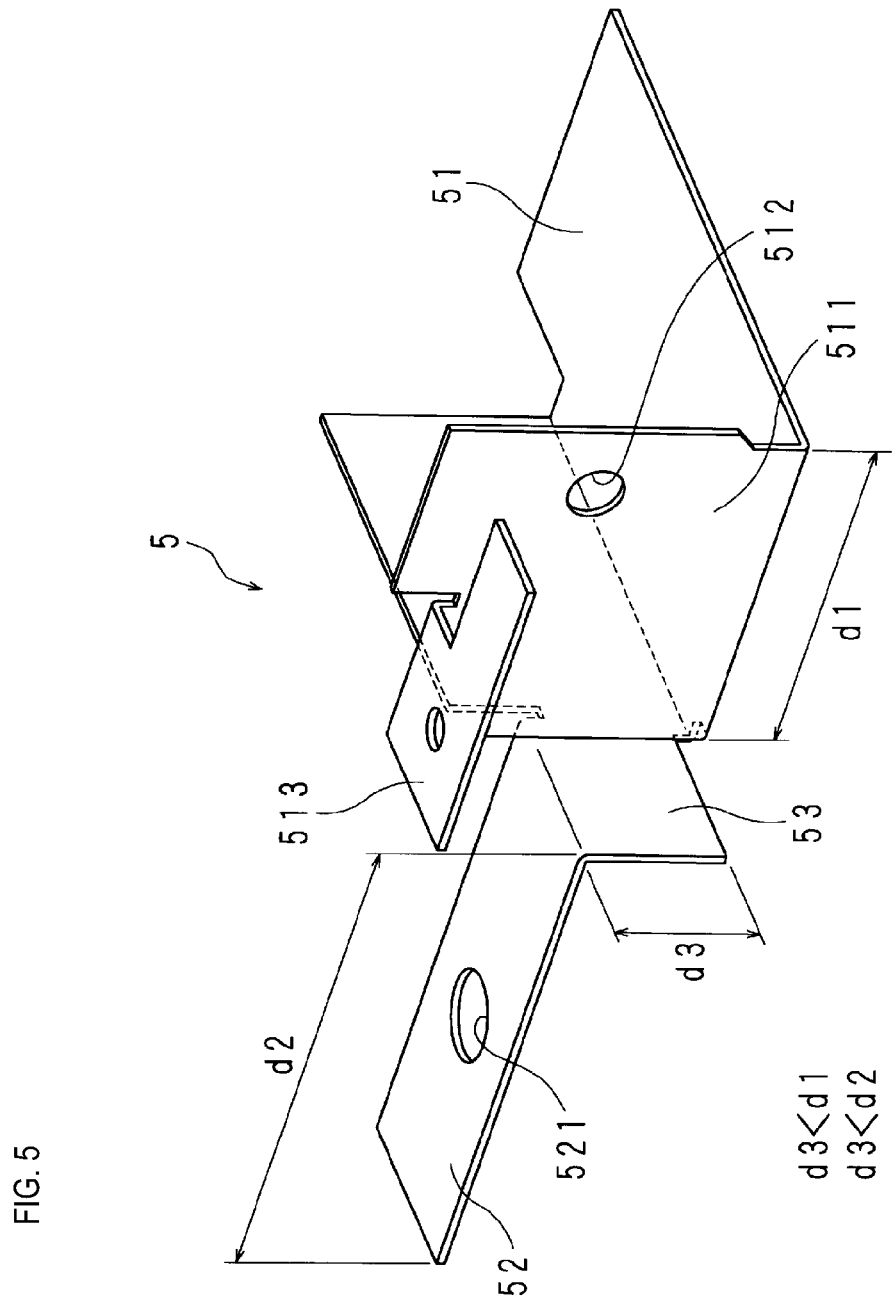
FIG. 5 is a perspective view of the bus bar.
Figure 6:
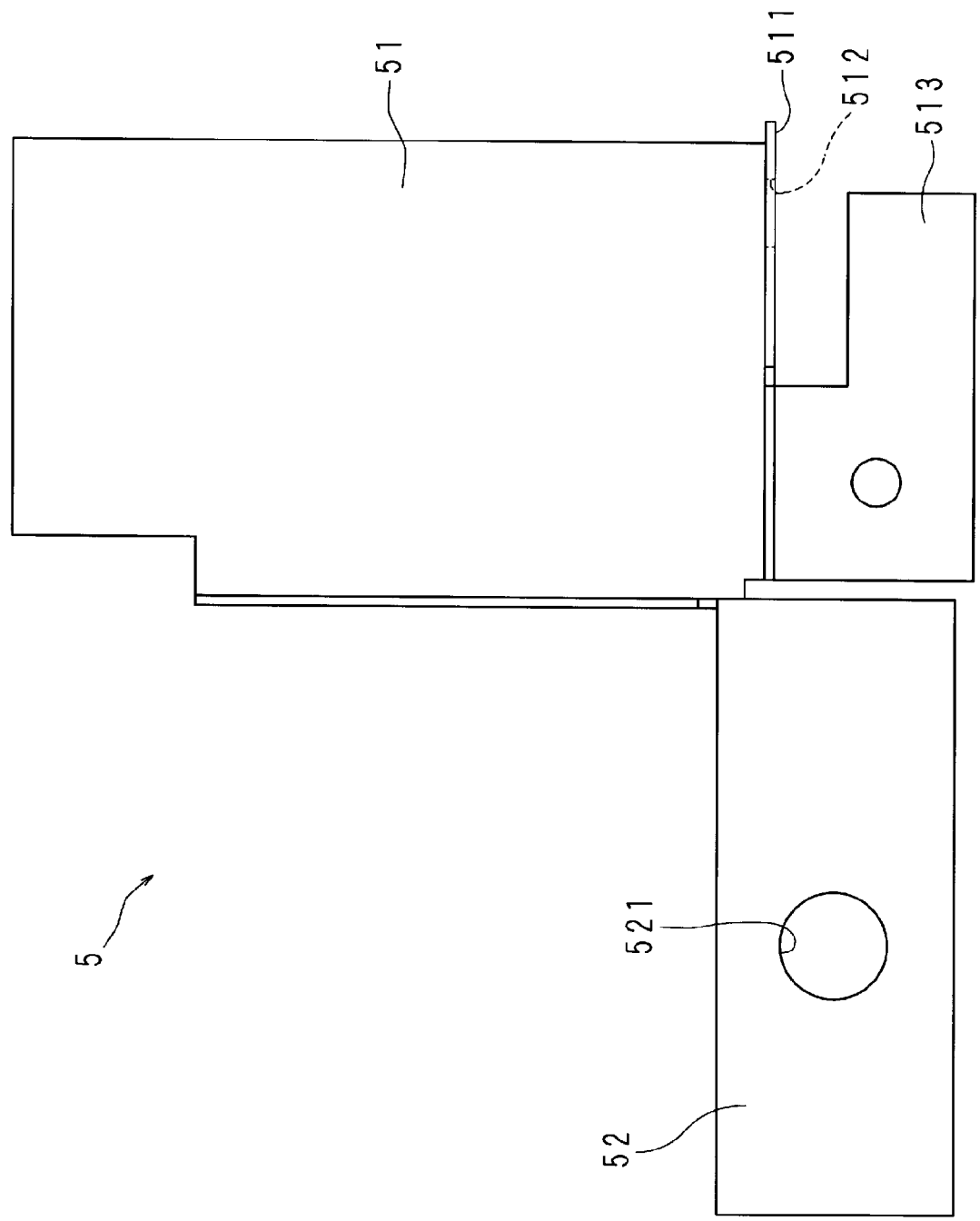
FIG. 6 is a plan view of the bus bar.
Figure 7:
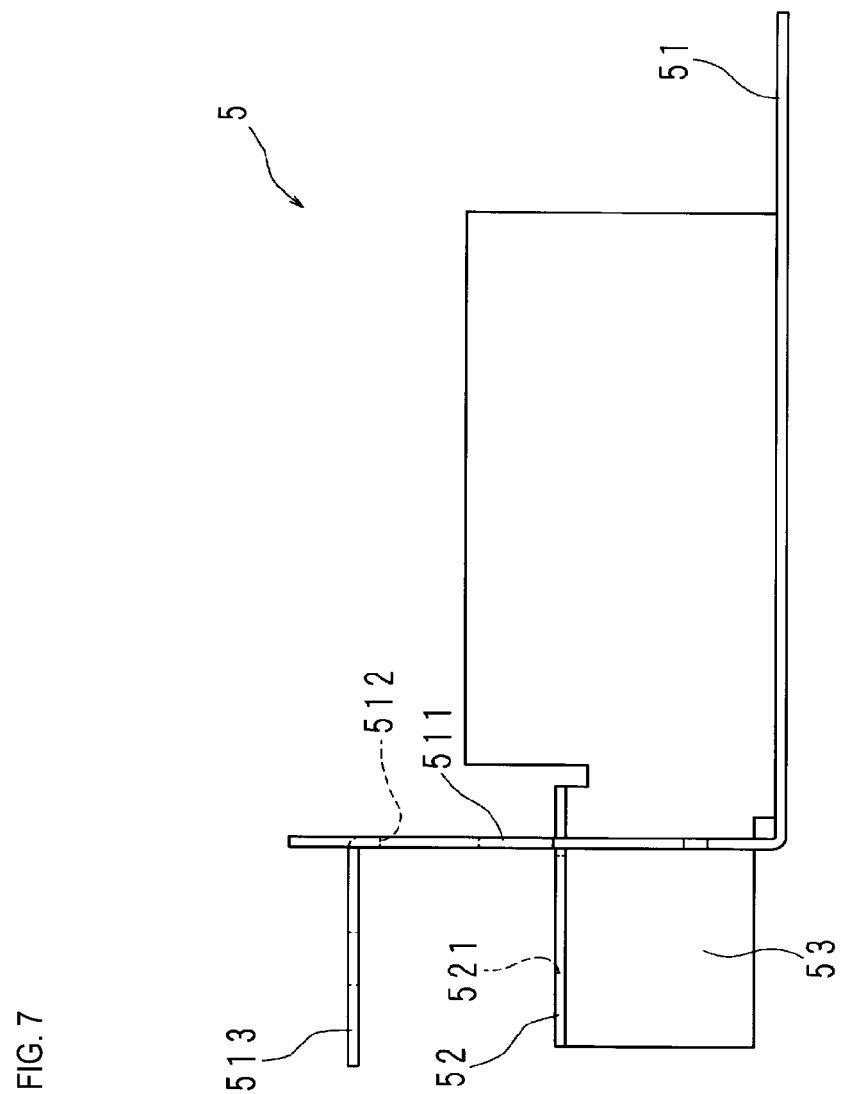
FIG. 7 is a side view of the bus bar.

FIG. 5 is a perspective diagram of the bus bar 5. FIG. 6 is a plan view of the bus bar 5. FIG. 7 is a side view of the bus bar 5. As described above, the bus bar 5 is a plate member having high conductive and heat transfer properties that is formed by processing such as sheet metal bending and punching using copper or a copper alloy as the material and has a plurality of bent portions. The bus bar 5 includes the first plate part 51, the second plate part 52 and the coupling plate part 53 that couples the first plate part 51 to the second plate part 52.

The first plate part 51 is rectangular in plan view, and the relay 41 is placed on the surface (upper surface in FIG. 5) of the first plate part 51. The heat dissipation member 31 is affixed to the back surface (lower surface in FIG. 5) of the first plate part 51.

The first terminal fastening piece 511 bent substantially perpendicular to the first plate part 51 to face the opposite side to the first plate part 51 is provided at an end portion of the first plate part 51. The first terminal fastening piece 511 has a rectangular shape, and a first terminal fastening hole 512 for fastening a relay terminal 411 is provided on the peripheral edge side thereof. A bent piece 513 bent substantially perpendicular to the first terminal fastening piece 511 is provided at an end portion of the first terminal fastening piece 511.

The second plate part 52 has a rectangular shape in plan view, and a second terminal connection hole 521 for fastening a fuse terminal 421 is provided in a central portion thereof. A fuse terminal 421 having a rectangular plate shape is placed on the surface of the second plate part 52 (upper surface in FIG. 5).

The coupling plate part 53 has a rectangular shape, is interposed between the first plate part 51 and the second plate part 52, and constitutes part of the heat transfer path from the second plate part 52 to the first plate part 51. As described above, there is a step due to the difference in height between the second plate part 52 to which the fuse terminal 421 is fastened and the first plate part 51 on which the relay 41 is placed, and the coupling plate part 53 is provided so as to take up the inter-surface distance resulting from this step. Accordingly, in the front view in FIG. 5, a crank shape is formed by the first plate part 51, the coupling plate part 53 and the second plate part 52.

When the surface width of the first plate part 51 is given as d1, the surface width of the second plate part 52 is given as d2, and the surface width of the coupling plate part 53 is given as d3, in the extension direction of the bus bar 5, the surface width (d3) of the coupling plate part 53 is smaller than the surface width (d1) of the first plate part 51 and the surface width (d2) of the surface width of the second plate part 52 (d3<d1 and d3<d2). The extension direction of the bus bar 5 is the disposition direction of the fuse 42 and the relay 41 that are connected by the bus bar 5, and may be taken as the direction, in the bus bar 5, from the second terminal connection hole 521 to which the fuse terminal 421 is fastened toward the first terminal connection hole 512 to which the relay terminal 411 is fastened.

Since the coupling plate part 53 is interposed between the first plate part 51 and the second plate part 52 and constitutes part of the heat transfer path from the second plate part 52 to the first plate part 51, the length of the heat transfer path can be reduced and heat transfer resistance can be reduced, by making the surface width of the coupling plate part 53 smaller than the surface widths of the first plate part 51 and the second plate part 52. Accordingly, heat generated from the fuse 42 connected to the second plate part 52 can be efficiently transferred to the first plate part 51, and heat generated from the fuse 42 can be efficiently dissipated, via the heat dissipation member 31 provided to overlap the first plate part 51.

Second Embodiment

Figure 8:
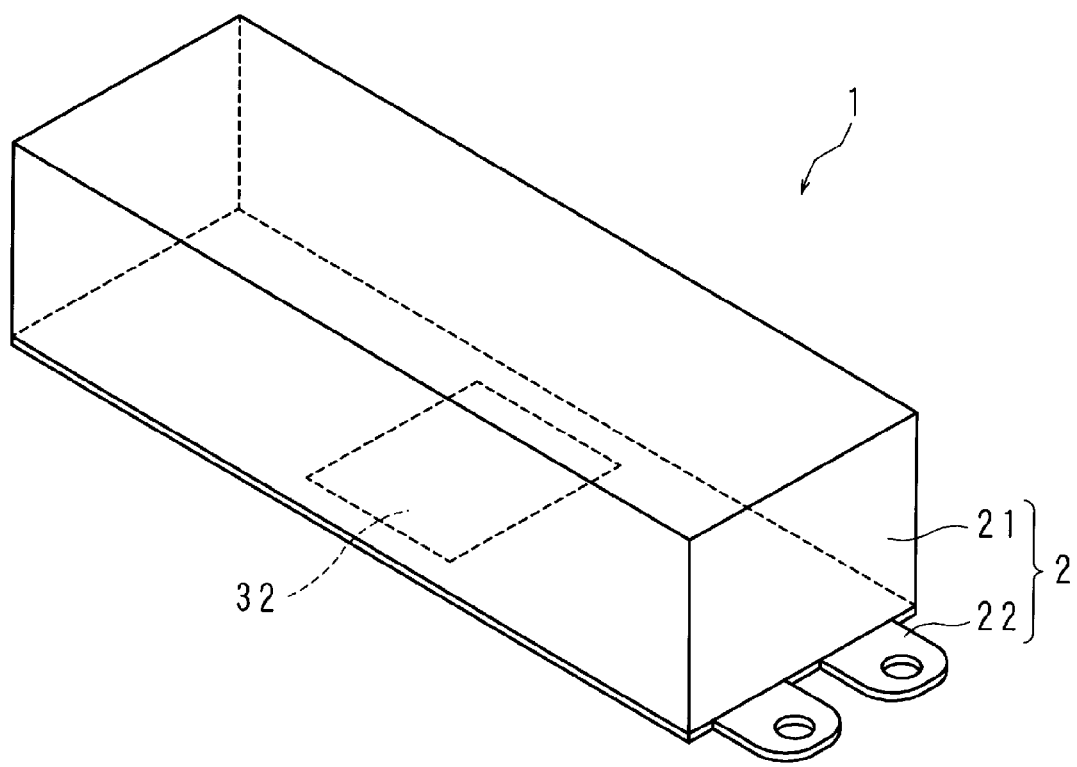
FIG. 8 is a perspective view schematically showing an outer appearance of an electrical connection box according to a second embodiment.
Figure 9:
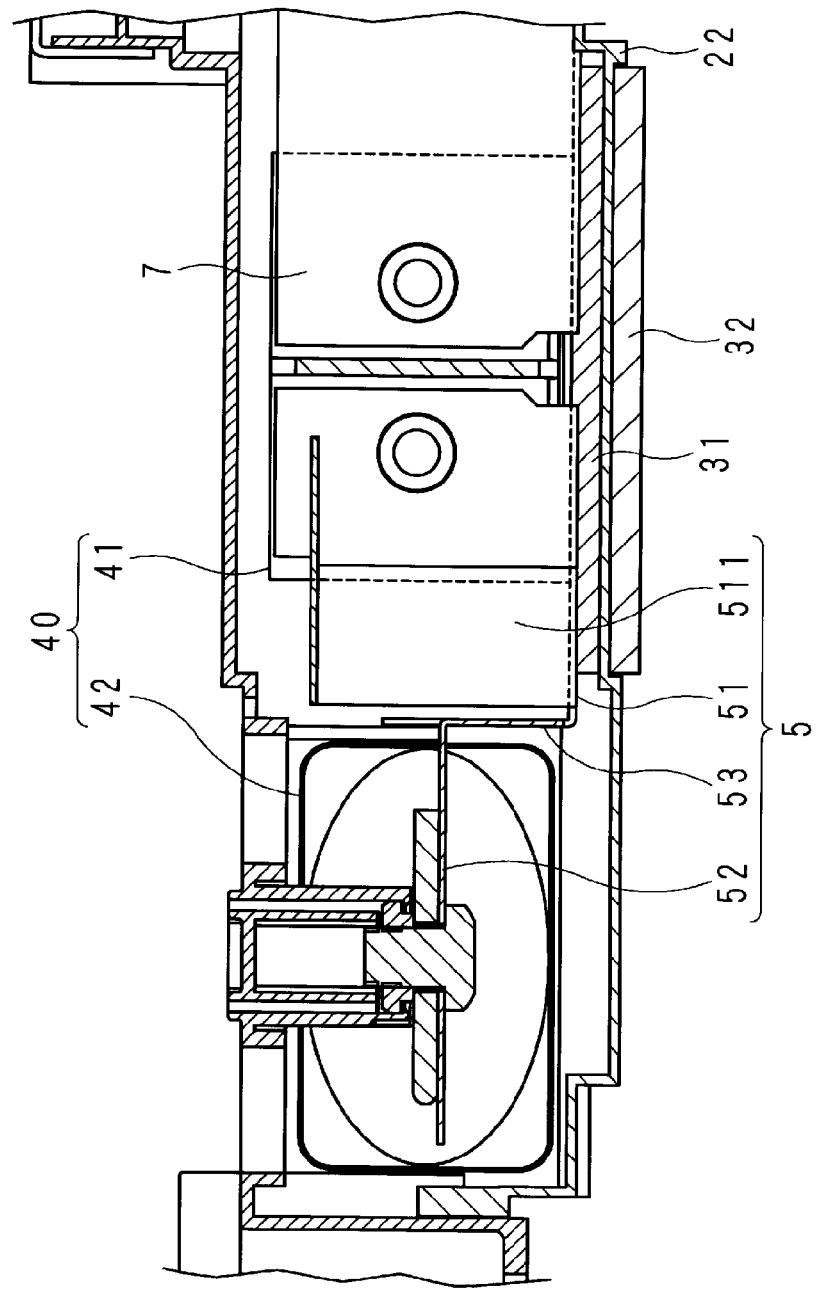
FIG. 9 is a side cross-sectional view schematically showing the inside of the electrical connection box.

FIG. 8 is a perspective view schematically showing an outer appearance of an electrical connection box 1 according to a second embodiment. FIG. 9 is a side cross-sectional view schematically showing the inside of the electrical connection box 1. The electrical connection box 1 according to the second embodiment includes a plurality of electrical components 40 including a fuse 42 and a relay 41, a bus bar 5, a second bus bar 7, a third bus bar 8, a temperature sensor 6, a heat dissipation member 31 and a second heat dissipation member 32, similarly to the electrical connection box 1 of the first embodiment. The plurality of electrical components 40 including the fuse 42 and the relay 41, the bus bar 5 connecting the fuse 42 and the relay 41, the second bus bar 7, the temperature sensor 6 and the heat dissipation member 31 are housed inside an upper case 21 constituting a casing 2 of the electrical connection box 1.

With the sheet-like heat dissipation member 31, one surface of this member (heat dissipation member 31) is provided opposing the inner surface of a lower case 22 provided so as to close the opening of the upper case 21, and the one surface of the heat dissipation member 31 and the inner surface of the lower case 22 are in intimate contact with each other. The second heat dissipation member 32 is affixed to the outer surface of the lower case 22. In adopting this configuration, the disposition relationship of the electrical components 40 such as the relay 41 and the fuse 42, the bus bar 5 and the like with the lower case 22 is similar to the disposition relationship of the electrical components 40, the bus bar 5 and the like with the bottom plate of the upper case 21 described in the first embodiment. A laminate structure is formed by the sheet-like heat dissipation member 31, the plate-like lower case 22 and the sheet-like second heat dissipation member 32, and heat generated by the relay 41 and the fuse 42 can be efficiently dissipated outside the electrical connection box 1 from the lower case 22, via the bus bar 5.

In the illustration of the present embodiment, the lower case 22 is interposed between the heat dissipation member 31 and the second heat dissipation member 32 to form a laminate structure constituted by the heat dissipation member 31, the lower case 22 and the second heat dissipation member 32, and, in the first embodiment, the bottom plate of the upper case 21 is interposed between the heat dissipation member 31 and the second heat dissipation member 32 to form a laminate structure constituted by the heat dissipation member 31, the bottom plate of the upper case 21 and the second heat dissipation member 32, but the disclosure is not limited thereto. The disposition of the heat dissipation member 31 and the second heat dissipation member 32 with respect to the upper case 21 and the lower case 22 constituting the casing 2 is determined as appropriate based on the shape and disposition of the fuse 42, the relay 41, the bus bar 5 and the like provided inside the casing 2, and, for example, the heat dissipation member 31 and the second heat dissipation member 32 may be provided on a side plate of the upper case 21. That is, the heat dissipation member 31 may be provided on an inner surface of a side plate of the upper case 21, and the second heat dissipation member 32 may be affixed to the outer surface of the side plate of the upper case 21.

The embodiments disclosed herein are considered to be illustrative in all respects and not restrictive. The scope of the disclosure is defined not by the meaning described above but by the claims, and all changes that come within the meaning and range of equivalency of the claims are intended to be embraced therein.

The invention claimed is:

1. An electrical connection box for installation in a vehicle, comprising:
  a bus bar to electrically and thermally interconnect a plurality of electrical components electrically connected to a power storage device or an in-vehicle load installed in the vehicle;
  a casing to house the plurality of electrical components and the bus bar; and
  a first heat dissipation member thermally connected to the bus bar and the casing,
  wherein at least two of the plurality of electrical components are disposed adjacent to each other,
  the bus bar dissipates heat from the two electrical components via the first heat dissipation member,
  the bus bar includes a first plate part to be in intimate contact with at least one of the two electrical components,
  a laminate structure is formed by the one electrical component, the first plate part of the bus bar, the first heat dissipation member, and the portion of the casing to which the first heat dissipation member is affixed,
  a first terminal fastening piece bent with respect to the first plate part is provided at an end portion of the first plate part, and
  a relay terminal of the electrical component in intimate contact with the first plate part is fastened to the first terminal fastening piece; and
  a second heat dissipation member provided on an outer surface of the casing,
  wherein a laminate structure is formed by the first heat dissipation member, the portion of the casing to which the first heat dissipation member is affixed, and the second heat dissipation member and wherein the first heat dissipation member and the second heat dissipation member are formed with an identical material and shape.

2. The electrical connection box according to claim 1, wherein the first heat dissipation member is sheet-like, and
  an area of the first heat dissipation member is larger than an area of a region the first plate part in intimate contact with the one electrical component.

3. The electrical connection box according to claim 1, wherein the bus bar includes:
  the first plate part to be in intimate contact with one of the two electrical components;
  a second plate part to be in intimate contact with the other electrical component; and
  a coupling plate part interposed between the first plate part and the second plate part, and
  a surface width of the coupling plate part in an extension direction of the bus bar is smaller than surface widths of the first plate part and the second plate part.

4. The electrical connection box according to claim 1, wherein an amount of heat generated per unit time by each of the two electrical components when power is supplied to the in-vehicle load from the power storage device differs, and
  the first heat dissipation member is provided on a side on which the electrical component that generates more heat out of the two electrical components is provided.

5. The electrical connection box according to claim 1, wherein the two electrical components are a relay and a fuse.

6. The electrical connection box according to claim 1, further comprising:
  a temperature sensor to detect heat generated by the two electrical components,
  wherein the temperature sensor is provided on the bus bar.

* * * * *